(12) United States Patent
Seo et al.

(10) Patent No.: US 7,720,356 B2
(45) Date of Patent: May 18, 2010

(54) RECORDING MEDIUM HAVING DATA STRUCTURE FOR MANAGING REPRODUCTION OF MULTIPLE REPRODUCTION PATH VIDEO DATA RECORDED THEREON AND RECORDING AND REPRODUCING METHODS AND APPARATUSES

(75) Inventors: Kang Soo Seo, Kyunggi-do (KR); Byung Jin Kim, Kyunggi-do (KR); Soung Hyun Um, Kyunggi-do (KR)

(73) Assignee: LG Electronics Inc, Seoul (KR)

( * ) Notice: Subject to any disclaimer, the term of this patent is extended or adjusted under 35 U.S.C. 154(b) by 1341 days.

(21) Appl. No.: 10/642,693

(22) Filed: Aug. 19, 2003

(65) Prior Publication Data
US 2004/0091246 A1     May 13, 2004

(30) Foreign Application Priority Data
Nov. 12, 2002     (KR) ............... 10-2002-0069937

(51) Int. Cl.
*H04N 7/00*     (2006.01)
(52) U.S. Cl. .......................................... 386/95
(58) Field of Classification Search ............ 386/96, 386/125, 83, 46, 95
See application file for complete search history.

(56) References Cited

U.S. PATENT DOCUMENTS

| | | | |
|---|---|---|---|
| 5,521,898 A | 5/1996 | Ogasawara | |
| 5,559,808 A | 9/1996 | Kostreski et al. | |
| 5,602,956 A | 2/1997 | Suzuki et al. | |
| 5,651,010 A | 7/1997 | Kostreski et al. | |
| 5,729,549 A | 3/1998 | Kostreski et al. | |
| 5,732,185 A | 3/1998 | Hirayama et al. | |
| 5,742,569 A | 4/1998 | Yamamoto et al. | |
| 5,747,136 A | 5/1998 | Shono et al. | |
| 5,771,334 A | 6/1998 | Yamauchi et al. | |
| 5,784,528 A | 7/1998 | Yamane et al. | |
| 5,819,003 A | 10/1998 | Hirayama et al. | |
| 5,835,493 A | 11/1998 | Magee et al. | |
| 5,854,873 A | 12/1998 | Mori et al. | |
| 5,870,523 A * | 2/1999 | Kikuchi et al. | 386/95 |
| 5,877,817 A | 3/1999 | Moon | |
| 5,884,004 A * | 3/1999 | Sato et al. | 386/98 |

(Continued)

FOREIGN PATENT DOCUMENTS

CA     2 377 690     11/2001

(Continued)

OTHER PUBLICATIONS

Office Action for corresponding European Application No. 03761863.4 dated Mar. 31, 2008.

(Continued)

*Primary Examiner*—Thai Tran
*Assistant Examiner*—Tat Chio
(74) *Attorney, Agent, or Firm*—Harness, Dickey & Pierce, P.L.C.

(57) ABSTRACT

The recording medium has a data structure for managing reproduction of at least multiple reproduction path video data recorded on the recording medium. One or more management areas of the recording medium store path change information. The path change information indicates where changes in reproducing at least one of the reproduction paths of video data are permitted.

30 Claims, 8 Drawing Sheets

U.S. PATENT DOCUMENTS

| | | | |
|---|---|---|---|
| 5,895,124 A | 4/1999 | Tsuga et al. | |
| 5,909,257 A | 6/1999 | Ohishi et al. | |
| 5,913,010 A * | 6/1999 | Kaneshige et al. | 386/70 |
| 5,940,255 A | 8/1999 | Uwabo et al. | |
| 5,949,792 A | 9/1999 | Yasuda et al. | |
| 5,953,187 A | 9/1999 | Uwabo et al. | |
| 5,966,352 A | 10/1999 | Sawabe et al. | |
| 5,987,126 A | 11/1999 | Okuyama et al. | |
| 5,999,698 A | 12/1999 | Nakai et al. | |
| 6,031,962 A * | 2/2000 | Sawabe et al. | 386/96 |
| 6,035,095 A | 3/2000 | Kaneshige et al. | |
| 6,064,796 A | 5/2000 | Nakamura et al. | |
| 6,067,400 A | 5/2000 | Saeki et al. | |
| 6,167,189 A | 12/2000 | Taira et al. | |
| 6,181,870 B1 | 1/2001 | Okada et al. | |
| 6,181,872 B1 | 1/2001 | Yamane et al. | |
| 6,185,365 B1 | 2/2001 | Murase et al. | |
| 6,195,726 B1 | 2/2001 | Hogan | |
| 6,219,488 B1 | 4/2001 | Mori et al. | |
| 6,222,805 B1 | 4/2001 | Mori et al. | |
| 6,285,825 B1 | 9/2001 | Miwa et al. | |
| 6,321,027 B2 | 11/2001 | Honjo | |
| 6,336,002 B1 | 1/2002 | Yamauchi et al. | |
| 6,343,062 B1 | 1/2002 | Furukawa et al. | |
| 6,351,442 B1 | 2/2002 | Tagawa et al. | |
| 6,353,613 B1 | 3/2002 | Kubota et al. | |
| 6,360,055 B1 | 3/2002 | Kaneshige et al. | |
| 6,377,747 B1 | 4/2002 | Murase et al. | |
| 6,385,388 B1 | 5/2002 | Lewis et al. | |
| 6,385,389 B1 | 5/2002 | Maruyama et al. | |
| 6,385,394 B1 | 5/2002 | Okada et al. | |
| 6,385,398 B1 | 5/2002 | Matsumoto | |
| 6,393,196 B1 | 5/2002 | Yamane et al. | |
| 6,393,574 B1 | 5/2002 | Kashiwagi et al. | |
| 6,415,101 B1 | 7/2002 | deCarmo et al. | |
| 6,424,797 B1 | 7/2002 | Murase et al. | |
| 6,445,872 B1 | 9/2002 | Sano et al. | |
| 6,470,140 B1 | 10/2002 | Sugimoto et al. | |
| 6,470,460 B1 | 10/2002 | Kashiwagi et al. | |
| 6,480,669 B1 * | 11/2002 | Tsumagari et al. | 386/95 |
| 6,504,996 B1 | 1/2003 | Na et al. | |
| 6,515,101 B1 | 2/2003 | Sheares | |
| 6,546,195 B2 | 4/2003 | Kashiwagi et al. | |
| 6,556,774 B2 | 4/2003 | Tsumagari et al. | |
| 6,564,006 B1 | 5/2003 | Mori et al. | |
| 6,567,608 B2 | 5/2003 | Mori et al. | |
| 6,573,819 B1 | 6/2003 | Oshima et al. | |
| 6,584,277 B2 | 6/2003 | Tsumagari et al. | |
| 6,603,517 B1 | 8/2003 | Shen et al. | |
| 6,618,396 B1 | 9/2003 | Kondo et al. | |
| 6,654,543 B2 | 11/2003 | Ando et al. | |
| 6,788,883 B1 | 9/2004 | Park et al. | |
| 6,801,713 B1 | 10/2004 | Yagawa et al. | |
| 6,901,078 B2 | 5/2005 | Morris | |
| 6,904,227 B1 | 6/2005 | Yamamoto et al. | |
| 7,024,102 B1 | 4/2006 | Inoshita et al. | |
| 7,072,573 B2 | 7/2006 | Okada et al. | |
| 7,106,946 B1 | 9/2006 | Kato | |
| 7,124,303 B2 | 10/2006 | Candelore et al. | |
| 7,236,687 B2 | 6/2007 | Kato et al. | |
| 7,245,825 B2 | 7/2007 | Kikuchi et al. | |
| 7,477,833 B2 * | 1/2009 | Kato et al. | 386/125 |
| 2001/0033517 A1 | 10/2001 | Ando et al. | |
| 2001/0038745 A1 | 11/2001 | Sugimoto et al. | |
| 2001/0043790 A1 | 11/2001 | Saeki et al. | |
| 2001/0053280 A1 | 12/2001 | Yamauchi et al. | |
| 2002/0015383 A1 | 2/2002 | Ueno | |
| 2002/0015581 A1 | 2/2002 | Ando et al. | |
| 2002/0021761 A1 | 2/2002 | Zhang et al. | |
| 2002/0031336 A1 | 3/2002 | Okada et al. | |
| 2002/0044757 A1 | 4/2002 | Kawamura et al. | |
| 2002/0046328 A1 | 4/2002 | Okada | |
| 2002/0076201 A1 | 6/2002 | Tsumagari et al. | |
| 2002/0097981 A1 | 7/2002 | Seo et al. | |
| 2002/0097984 A1 | 7/2002 | Abecassis | |
| 2002/0106196 A1 | 8/2002 | Yamauchi et al. | |
| 2002/0126991 A1 | 9/2002 | Kawamura et al. | |
| 2002/0127002 A1 | 9/2002 | Mori et al. | |
| 2002/0131767 A1 | 9/2002 | Auwens et al. | |
| 2002/0145702 A1 | 10/2002 | Kato et al. | |
| 2002/0150383 A1 | 10/2002 | Kato et al. | |
| 2002/0159368 A1 | 10/2002 | Noda et al. | |
| 2002/0180803 A1 | 12/2002 | Kaplan et al. | |
| 2002/0196365 A1 | 12/2002 | Cho et al. | |
| 2002/0197059 A1 | 12/2002 | Cho et al. | |
| 2003/0002194 A1 | 1/2003 | Andoh | |
| 2003/0026597 A1 | 2/2003 | Cho et al. | |
| 2003/0113096 A1 | 6/2003 | Taira et al. | |
| 2003/0118327 A1 | 6/2003 | Um et al. | |
| 2003/0123849 A1 | 7/2003 | Nallur et al. | |
| 2003/0133509 A1 | 7/2003 | Yanagihara et al. | |
| 2003/0161615 A1 | 8/2003 | Tsumagari et al. | |
| 2003/0221055 A1 | 11/2003 | Okada | |
| 2003/0235403 A1 | 12/2003 | Seo et al. | |
| 2003/0235404 A1 | 12/2003 | Seo et al. | |
| 2003/0235405 A1 | 12/2003 | Seo et al. | |
| 2004/0001700 A1 | 1/2004 | Seo et al. | |
| 2004/0068606 A1 | 4/2004 | Kim et al. | |
| 2004/0086261 A1 | 5/2004 | Hanes | |
| 2004/0156621 A1 | 8/2004 | Seo et al. | |
| 2004/0179819 A1 | 9/2004 | Cho et al. | |
| 2004/0179820 A1 | 9/2004 | Kashiwagi et al. | |
| 2004/0179827 A1 | 9/2004 | Cho et al. | |
| 2004/0247290 A1 | 12/2004 | Seo et al. | |
| 2004/0252975 A1 | 12/2004 | Cho et al. | |
| 2005/0019007 A1 | 1/2005 | Kato et al. | |
| 2005/0025459 A1 | 2/2005 | Kato et al. | |
| 2005/0025461 A1 | 2/2005 | Kato et al. | |
| 2005/0036763 A1 | 2/2005 | Kato et al. | |
| 2005/0232111 A1 | 10/2005 | Sawabe et al. | |
| 2005/0254363 A1 | 11/2005 | Hamada et al. | |
| 2006/0098936 A1 | 5/2006 | Ikeda et al. | |
| 2006/0222340 A1 | 10/2006 | Yamauchi et al. | |
| 2007/0031122 A1 | 2/2007 | Yamagata et al. | |
| 2008/0019675 A1 | 1/2008 | Hamasaka et al. | |

FOREIGN PATENT DOCUMENTS

| | | | |
|---|---|---|---|
| CN | 1134583 | | 10/1996 |
| CN | 1197574 | | 4/1997 |
| CN | 1197573 | A | 10/1998 |
| CN | 1272209 | | 2/1999 |
| CN | 1220458 | | 6/1999 |
| CN | 1251680 | | 7/1999 |
| CN | 1317200 | | 7/1999 |
| CN | 1237852 | | 12/1999 |
| CN | 1251461 | | 4/2000 |
| EP | 0 723 216 | | 7/1996 |
| EP | 0 737 980 | A2 | 10/1996 |
| EP | 0 788 105 | | 8/1997 |
| EP | 0 798 722 | | 10/1997 |
| EP | 0 814 475 | | 12/1997 |
| EP | 0 836 183 | | 4/1998 |
| EP | 0 875 856 | | 4/1998 |
| EP | 0 847 195 | | 6/1998 |
| EP | 0 873 022 | | 10/1998 |
| EP | 0 896 337 | A2 | 2/1999 |
| EP | 0 903 744 | | 3/1999 |
| EP | 0 847 198 | | 4/1999 |
| EP | 0 917 355 | | 5/1999 |
| EP | 0 836 189 | | 8/1999 |
| EP | 0 737 980 | | 9/1999 |
| EP | 0 940 983 | | 9/1999 |
| EP | 0967604 | | 12/1999 |

| | | |
|---|---|---|
| EP | 1003338 A2 | 5/2000 |
| EP | 1 043 724 | 10/2000 |
| EP | 1 120 789 | 8/2001 |
| EP | 1 126 454 | 8/2001 |
| EP | 1 198 132 | 4/2002 |
| EP | 1 198 133 | 4/2002 |
| EP | 1256954 | 11/2002 |
| EP | 1 202 568 | 7/2003 |
| EP | 0 918 438 | 8/2004 |
| EP | 0 920 203 | 9/2004 |
| EP | 1 469 677 | 10/2004 |
| EP | 1 081 885 | 3/2005 |
| GB | 2351888 | 1/2001 |
| JP | 64-003781 | 1/1989 |
| JP | 01-116819 | 5/1989 |
| JP | 08-088832 | 4/1996 |
| JP | 08-235833 | 9/1996 |
| JP | 8-511146 | 11/1996 |
| JP | 09-023403 | 1/1997 |
| JP | 09-251759 | 9/1997 |
| JP | 10-032780 | 2/1998 |
| JP | 10-040667 | 2/1998 |
| JP | 10-051737 | 2/1998 |
| JP | 10-155138 | 6/1998 |
| JP | 10-255443 | 9/1998 |
| JP | 10-269698 | 10/1998 |
| JP | 10-271449 | 10/1998 |
| JP | 10-299698 | 11/1998 |
| JP | 10-340570 | 12/1998 |
| JP | 11-041563 | 2/1999 |
| JP | 11-066813 | 3/1999 |
| JP | 11-103444 | 4/1999 |
| JP | 11-134812 | 5/1999 |
| JP | 11-185463 | 7/1999 |
| JP | 11-259976 | 9/1999 |
| JP | 11-346341 | 12/1999 |
| JP | 11341443 | 12/1999 |
| JP | 2000-030414 | 1/2000 |
| JP | 2000-041066 | 2/2000 |
| JP | 2000-069437 | 3/2000 |
| JP | 2000-113602 | 4/2000 |
| JP | 2000-149514 | 5/2000 |
| JP | 2000-235779 | 8/2000 |
| JP | 2000-293938 | 10/2000 |
| JP | 2000-299836 | 10/2000 |
| JP | 2000-348442 | 12/2000 |
| JP | 2001-024973 | 1/2001 |
| JP | 2001-024985 | 1/2001 |
| JP | 2001-111944 | 1/2001 |
| JP | 2001-067802 | 3/2001 |
| JP | 2001-111929 | 4/2001 |
| JP | 2001-111960 | 4/2001 |
| JP | 2001-169246 | 6/2001 |
| JP | 2001-297535 | 10/2001 |
| JP | 2001-332006 A | 11/2001 |
| JP | 2002-083486 | 3/2002 |
| JP | 2002-112179 | 4/2002 |
| JP | 2002-150685 | 5/2002 |
| JP | 2002-158971 | 5/2002 |
| JP | 2002-158972 | 5/2002 |
| JP | 2002-158974 | 5/2002 |
| JP | 2002-171472 | 6/2002 |
| JP | 2002-176623 | 6/2002 |
| JP | 2002-216460 | 8/2002 |
| JP | 2002-222581 | 8/2002 |
| JP | 2003-087744 | 3/2003 |
| JP | 2003-116100 | 4/2003 |
| JP | 2004-048396 | 2/2004 |
| JP | 2005-252432 | 9/2005 |
| JP | 2006-503400 | 1/2006 |
| KR | 10-1999-22858 | 3/1999 |
| KR | 10-2000-0031861 | 6/2000 |
| KR | 10-2000-0055028 | 9/2000 |
| KR | 10-2000-0056179 | 9/2000 |
| KR | 10-2000-0065876 | 11/2000 |
| KR | 10-2001-0022702 | 3/2001 |
| KR | 10-0294884 | 4/2001 |
| KR | 10-2001-0098007 | 11/2001 |
| KR | 10-2001-0098101 | 11/2001 |
| KR | 10-2001-0107578 | 12/2001 |
| KR | 10-2002-0006674 | 1/2002 |
| KR | 10-2002-0020919 | 3/2002 |
| KR | 10-2002-0097454 | 12/2002 |
| KR | 10-2002-0097455 | 12/2002 |
| KR | 10-2004-0000290 | 1/2004 |
| KR | 10-2004-0030992 | 4/2004 |
| KR | 10-2004-0030994 | 4/2004 |
| KR | 10-2004-0030995 | 4/2004 |
| KR | 10-2004-0041581 | 5/2004 |
| TW | 391548 | 5/2000 |
| WO | WO 97/06531 | 2/1997 |
| WO | 97/13366 | 4/1997 |
| WO | WO 97/13365 | 4/1997 |
| WO | WO 97/31374 | 8/1997 |
| WO | WO 97/39451 | 10/1997 |
| WO | WO 98/00952 | 1/1998 |
| WO | WO 99/08281 | 2/1999 |
| WO | WO 00/02195 | 1/2000 |
| WO | WO 00/42515 | 7/2000 |
| WO | WO 00/62295 | 10/2000 |
| WO | WO 01/80239 | 10/2001 |
| WO | WO 01/82604 | 11/2001 |
| WO | WO 01/82606 | 11/2001 |
| WO | WO 01/82609 | 11/2001 |
| WO | WO 01/82610 | 11/2001 |
| WO | WO 04/001748 | 12/2003 |
| WO | WO 04/001750 | 12/2003 |
| WO | WO 04/001753 | 12/2003 |
| WO | 2004/045206 | 5/2004 |
| WO | WO 2004/042723 | 5/2004 |
| WO | WO 2004-075183 | 9/2004 |
| WO | WO 2004/077417 | 9/2004 |
| WO | WO 2004/079736 | 9/2004 |
| WO | WO 2004/081939 | 9/2004 |
| WO | WO 2004/086371 | 10/2004 |

OTHER PUBLICATIONS

Office Action for corresponding Japanese Application No. 2004-517368 dated May 7, 2008.
Office Action for corresponding Japanese Application No. 2004-517390 dated May 7, 2008.
Office Action dated Apr. 22, 2008 for corresponding Japanese Application No. 2006-196199 and English translation thereof.
Office Action dated May 20, 2008 for corresponding Japanese Application No. 2004-553264.
European Search Report dated Aug. 13, 2008.
Japanese Office Action corresponding to Japanese Application No. 2004-517390 dated Nov. 4, 2008.
Office Action dated Jun. 25, 2009 by USPTO for counterpart U.S. Appl. No. 10/702,557.
Office Action dated Jul. 7, 2009 by Japanese Patent Office for counterpart Japanese application.
Office Action dated Jul. 9, 2009 by Australian Patent Office for counterpart Australian application.
Office Action dated Jul. 17, 2009 by Japanese Patent Office for counterpart Japanese application.
Office Action dated Dec. 14, 2009 by the Australian Patent Office for counterpart Australian application.
Office Action dated Dec. 31, 2009 by USPTO for counterpart U.S. Appl. No. 10/702,557.
Office Action dated Oct. 8, 2009 by the European Patent Office for counterpart European application #03733603.
Office Action dated Oct. 8, 2009 by the European Patent Office for counterpart European application #03811859.

Office Action dated Oct. 15, 2009 by the USPTO for counterpart application 10/607,984.
Search Report dated Nov. 30, 2009 for counterpart European Application No. 03811549.9.
Chinese Office Action dated Dec. 14, 2007.
Japanese Office Action dated Jan. 22, 2008.
European Search Report dated Dec. 28, 2007.
European Search Report dated Jan. 2, 2008.
Australian Second Official Communication dated May 18, 2007.
Korean Office Action dated Feb. 10, 2006.
United States Office Action dated Jan. 2, 2008.
United States Office Action dated Jan. 28, 2008.

* cited by examiner

RECORDING MEDIUM HAVING DATA STRUCTURE FOR MANAGING REPRODUCTION OF MULTIPLE REPRODUCTION PATH VIDEO DATA RECORDED THEREON AND RECORDING AND REPRODUCING METHODS AND APPARATUSES

BACKGROUND OF THE INVENTION

1. Field of the Invention

The present invention relates to a recording medium having a data structure for managing reproduction of at least multiple reproduction path video data recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RE) is one example of these new optical disks.

Figure 1:
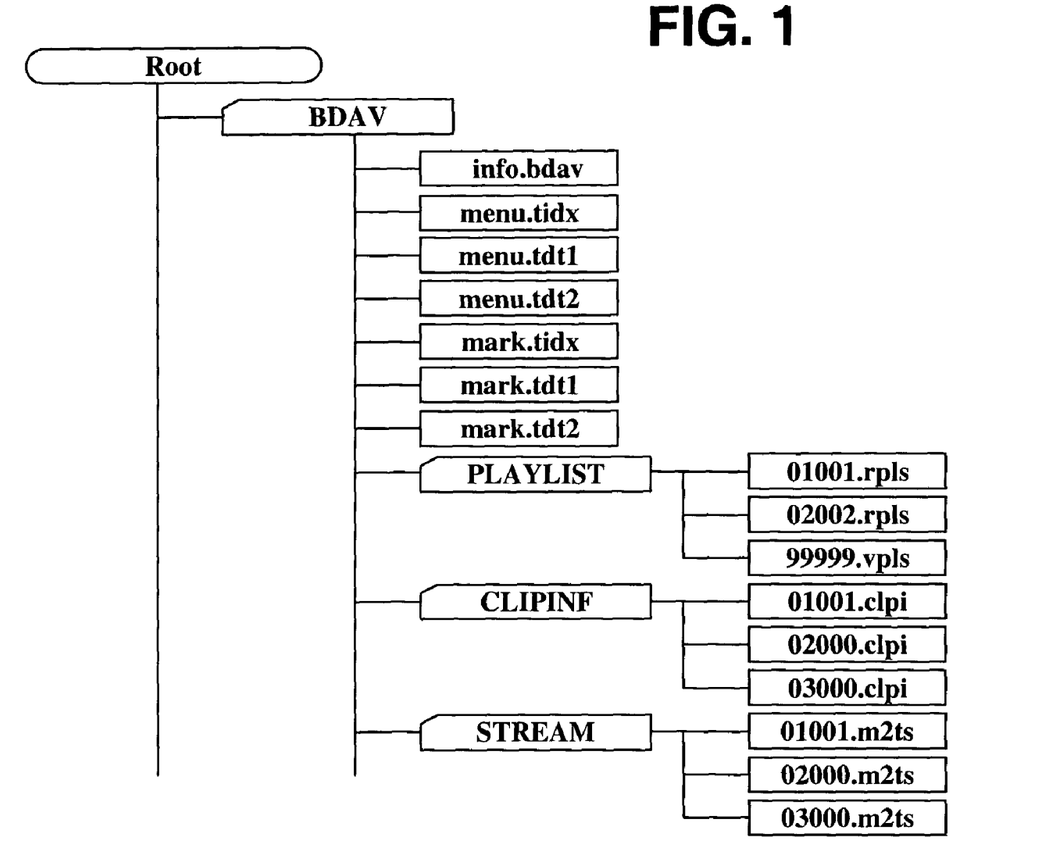
FIG. 1 illustrates the prior art file or data structure of a rewritable optical disk according to the Blu-ray Disc Rewritable (BD-RE) standard.

FIG. 1 illustrates the file structure of the BD-RE. The file structure or data structure provides for managing the reproduction of the video and audio data recorded on the BD-RE. As shown, the data structure includes a root directory that contains at least one BDAV directory. The BDAV directory includes files such as 'info.bdav', 'menu.tidx', and 'mark.tidx', a PLAYLIST subdirectory in which playlist files (*.rpls and *.vpls) are stored, a CLIPINF subdirectory in which clip information files (*.clpi) are stored, and a STREAM subdirectory in which MPEG2-formatted A/V stream clip files (*.m2ts) corresponding to the clip information files are stored. In addition to illustrating the data structure of the optical disk, FIG. 1 represents the areas of the optical disk. For example, the general information file info.bdav is stored in a general information area or areas on the optical disk.

Because the BD-RE data structure and disk format as illustrated in FIG. 1 is well-known and readily available, only a brief overview of the file structure will be provided in this disclosure.

As alluded to above, the STREAM directory includes MPEG2-formatted A/V stream files called clips or clip files. The STREAM directory may also include a special type of clip referred to as a bridge-clip A/V stream file. A bridge-clip is used for making seamless connection between two or more presentation intervals selected in the clips, and generally have a small data size compared to the clips. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.bdav file is a general information file that provides general information for managing the reproduction of the A/V stream recorded on the optical disk. More specifically, the info.bdav file includes, among other things, a table of playlists that identifies the file names of the playlist in the PLAYLIST directory of the same BDAV directory.

The menu.tidx, menu.tdt1 and menu.tdt2 files store information related to menu thumbnails. The mark.tidx, mark.tdt1 and mark.tdt2 files store information that relates to mark thumbnails. Because these files are not particularly relevant to the present invention, they will not be discussed further.

The standardization for high-density read-only optical disks such as the Blu-ray ROM (BD-ROM) is still under way. An effective data structure for managing reproduction of video and audio data recorded on the high-density read-only optical disk such as a BD-ROM is not yet available.

SUMMARY OF THE INVENTION

The recording medium according to the present invention includes path management information for managing the reproduction of at least multiple reproduction path video data (e.g., different camera angles of video data).

In one exemplary embodiment, the recording medium includes one or more management areas storing path change information. The path change information indicates where changes in reproducing at least one of the reproduction paths of video data are permitted. For example, in one exemplary embodiment, the path change information includes one or more flags associated with each reproduction path of video data. Each flag indicates whether and where a change in reproducing the associated reproduction path of video data is permitted.

In an exemplary embodiment, the path change information includes at least one entry point map associated with each reproduction path. Each entry point map identifies entry points in the video data for the associated reproduction path and includes at least one flag. Each flag is associated with an entry point and identifies whether a change in reproduction path is permitted in relation to the entry point.

According to a further embodiment of the present invention, the flags permitting a change in a same associated reproduction path define one or more units of video data, and at least a portion of the video data recorded on the recording medium is multiplexed on a unit of video data basis.

The present invention further provides apparatuses and methods for recording and reproducing the data structure according to the present invention.

BRIEF DESCRIPTION OF THE DRAWINGS

The above features and other advantages of the present invention will be more clearly understood from the following detailed description taken in conjunction with the accompanying drawings, in which.

DESCRIPTION OF THE PREFERRED EMBODIMENTS

In order that the invention may be fully understood, preferred embodiments thereof will now be described with reference to the accompanying drawings.

Figure 2:
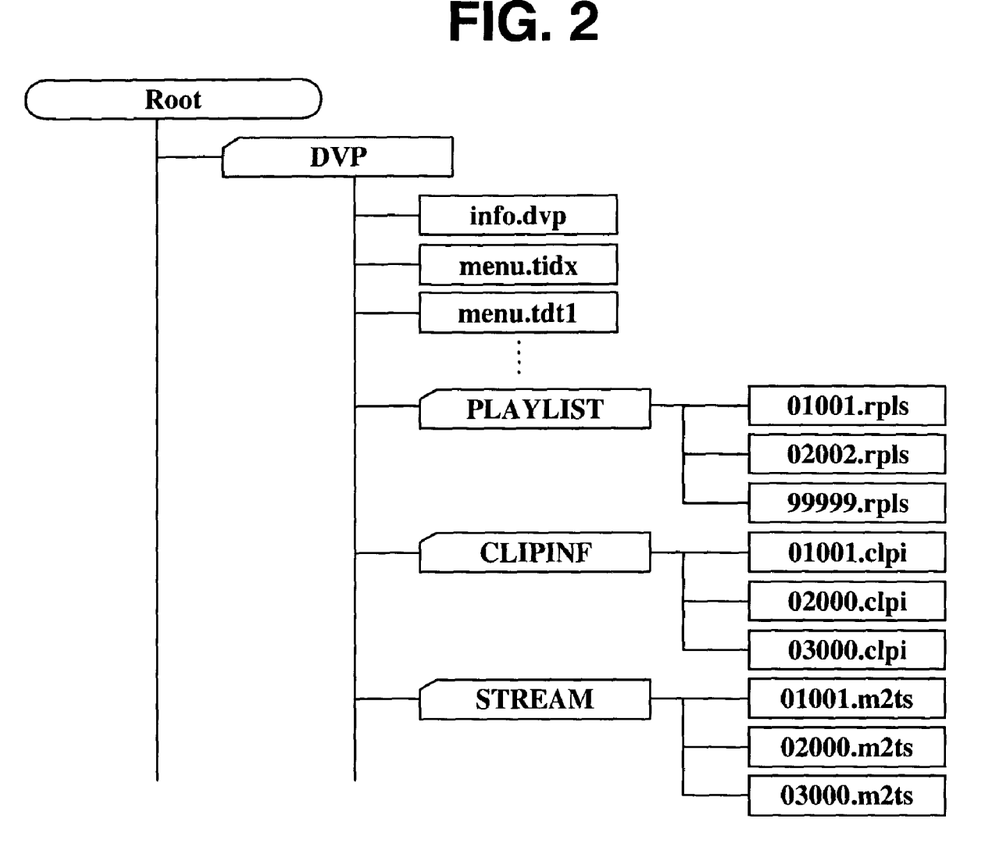
FIG. 2 illustrates an exemplary embodiment of a recording medium file or data structure according to the present invention.

A high-density optical disk, for example, a Blu-Ray ROM (BD-ROM), BD-RE, etc. in accordance with the invention may have a file or data structure for managing reproduction of video and audio data as shown in FIG. 2. Many aspects of the data structure according to the present invention shown in FIG. 2 are similar to that of the BD-RE standard discussed with respect to FIG. 1. As such these aspects will not be described in great detail.

As shown in FIG. 2, the root directory contains at least one DVP directory. The DVP directory includes a general information file info.dvp, menu files menu.tidx, menu.tdt1 among others, a PLAYLIST directory in which playlist files (e.g., real (*.rpls) and virtual (*.vpls)) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clips or clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.dvp file is a general information file that provides general information for managing the reproduction of the A/V streams recorded on the optical disk. More specifically, the info.dvp file includes, among other things, a table of playlists that identifies the file names of the playlists in the PLAYLIST directory. The info.dvp file will be discussed in greater detail below with respect to the embodiments of the present invention.

Figure 3:
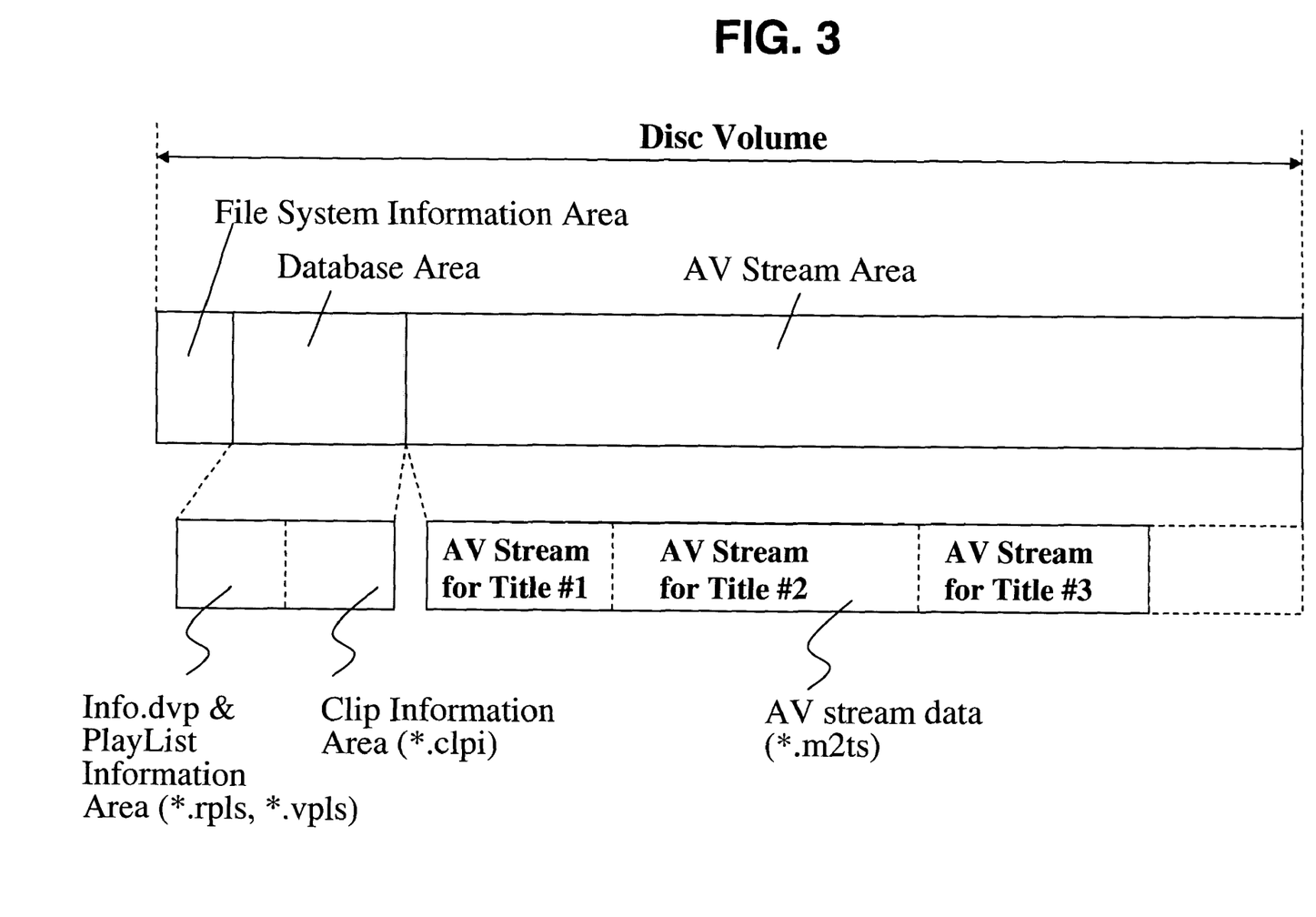
FIG. 3 illustrates an example of a recording medium having the data structure of FIG. 2 stored thereon.

In addition to illustrating the data structure of the recording medium according to an embodiment of the present invention, FIG. 2 represents the areas of the recording medium. For example, the general information file is recorded in one or more general information areas, the playlist directory is recorded in one or more playlist directory areas, each playlist in a playlist directory is recorded in one or more playlist areas of the recording medium, etc. FIG. 3 illustrates an example of a recording medium having the data structure of FIG. 2 stored thereon. As shown, the recording medium includes a file system information area, a data base area and an A/V stream area. The data base area includes a general information file and playlist information area and a clip information area. The general information file and playlist information area have the general information file recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM and BD-RE optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version, camera angle, etc. represents a different reproduction path, and the video data in these instances is referred to as multiple reproduction path video data. It will be appreciated that the above examples of multiple reproduction path video data are not limiting, and the present invention is applicable to any type or combination of types of multiple reproduction path video data. As will be described in detail below with respect to embodiments of the present invention, the data structures according to the present invention include path management information and/or navigation information for managing reproduction of multiple reproduction path video data recorded on the recording medium.

Figure 4:
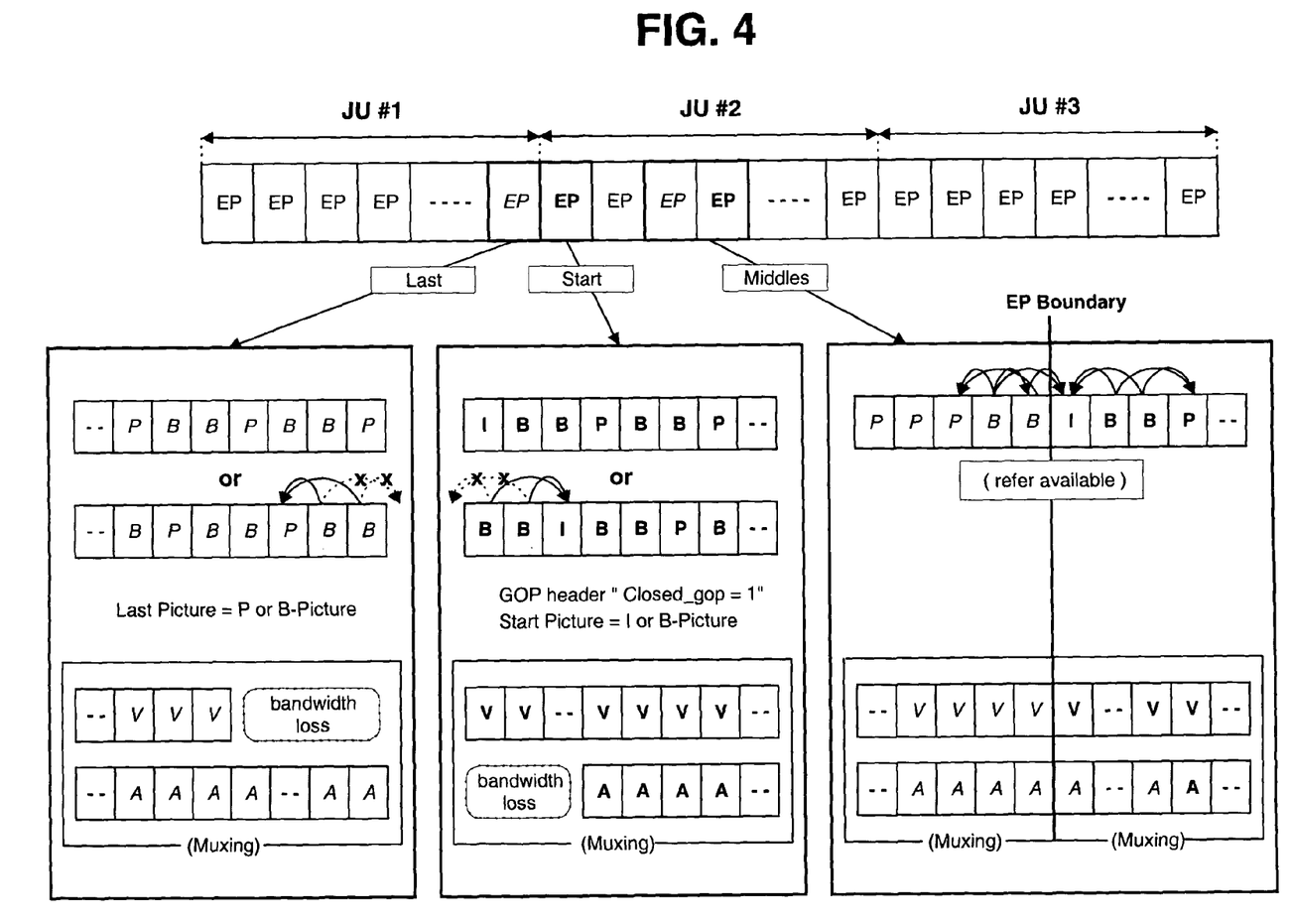
FIGS. 4-6 illustrate embodiments of the data structure associated with reproduction path management for use in the data structure according to FIG. 2.

A first embodiment of the reproduction path management information for use in the data structure according to FIG. 2 will now be described with respect to FIG. 4. According to this embodiment, the multiple reproduction path data is recorded in a plurality of clip files such that each clip files is associated with one of the reproduction paths. The clip files in this embodiment are recorded on the recording medium in a non-interleaved fashion. FIG. 4 illustrates an exemplary clip file corresponding to a reproduction path according to this embodiment of the present invention. As shown, the clip file is divided into a plurality of entry points (EPs), which are referenced in an EP map of an associated clip information file. The entry points are group into units referred to as jumping units, for example, jumping units JU#1, JU#2 and JU#3 shown in FIG. 4. During reproduction, changing between reproduction paths occurs on a jumping unit basis. Namely, upon receipt of a reproduction path change request from a user, reproduction of the currently reproduced jumping unit is completed, and reproduction then continues at the beginning of a jumping unit in a clip file associated with the newly requested reproduction path.

As further shown in FIG. 4 with respect to the last entry point in the first jumping unit JU#1, the last picture of video data in the last entry point of each jumping unit is restricted to being a P-picture or B-picture. And, if the last picture is a B-picture, the last picture is restricted to refer to a preceding P-picture without referring to a following I-picture included in a subsequent entry point.

Also, auxiliary data, for example, audio data, associated with the video data corresponding to the last entry point of the first jumping unit, is recorded in a state of being multiplexed with the video data. In this case, the trailing end of the entry point is recorded with only the audio data, which has a low recording bit rate, without being recorded with the video data which has a high recording bit rate. For this reason, bandwidth loss of recording bit rate occurs.

FIG. 4 further shows, with respect to the first entry point in the second jumping unit JU#2, that the first picture of video data in the starting entry point of each jumping unit is restricted to being an I-picture or B-picture. And, if the first picture is a B-picture, the first picture is restricted to refer to a following I-picture without referring to a preceding P-picture included in a previous entry point. In this case, a flag "Closed_gop=1" may be recorded in a GOP (Group Of Pictures) header of the entry point indicating that the entry point begins with a closed GOP. Namely, each jumping unit begins with a closed GOP.

Also, auxiliary data, for example, audio data, associated with the video data corresponding to the starting entry point of a jumping unit is recorded in a state of being multiplexed with the video data. In this case, the leading end of the entry point is recorded with only the video data, which has a high recording bit rate, without being recorded with the audio data which has a low recording bit rate. For this reason, a small quantity of bandwidth loss of recording bit rate occurs.

As further shown in FIG. 4 with respect to middle entry points in the second jumping unit JU#2, each B-picture of video data in the middle entry points of each jumping unit refers to preceding and following I or P-pictures, irrespective of a boundary between entry points.

Also, the video data corresponding to each entry point, and the auxiliary data, for example, audio data, associated with the video data are recorded in a state of being multiplexed with each other. When the multiplexing of the video data corresponding to one entry point with the associated audio data is completed under the condition in which there remains a part of the associated audio data not multiplexed with the video data, this residual non-multiplexed audio data is recorded while being multiplexed with the video data corresponding to the next entry point. Accordingly, there is no occasion that video data or audio data is recorded alone. Thus, there is no bit bandwidth loss.

In accordance with the present invention, it is possible to minimize the total bandwidth loss of the recording bit rate for each jumping unit because, even though there is bandwidth loss of the recording bit rate in the leading end of the starting entry point in each jumping unit and the trailing end of the last entry point in each jumping unit, there is no bandwidth loss of the recording bit rate in the other entry points.

Management of entry points may be carried out in such a fashion that one entry point is managed by one jumping unit. In this case, however, increased bandwidth loss of the recording bit rate occurs because video data is recorded alone in the leading portion of each entry point and audio data is recorded alone in the trailing portion of each entry point, and the efficiency of recording data streams is greatly reduced.

Figure 5:
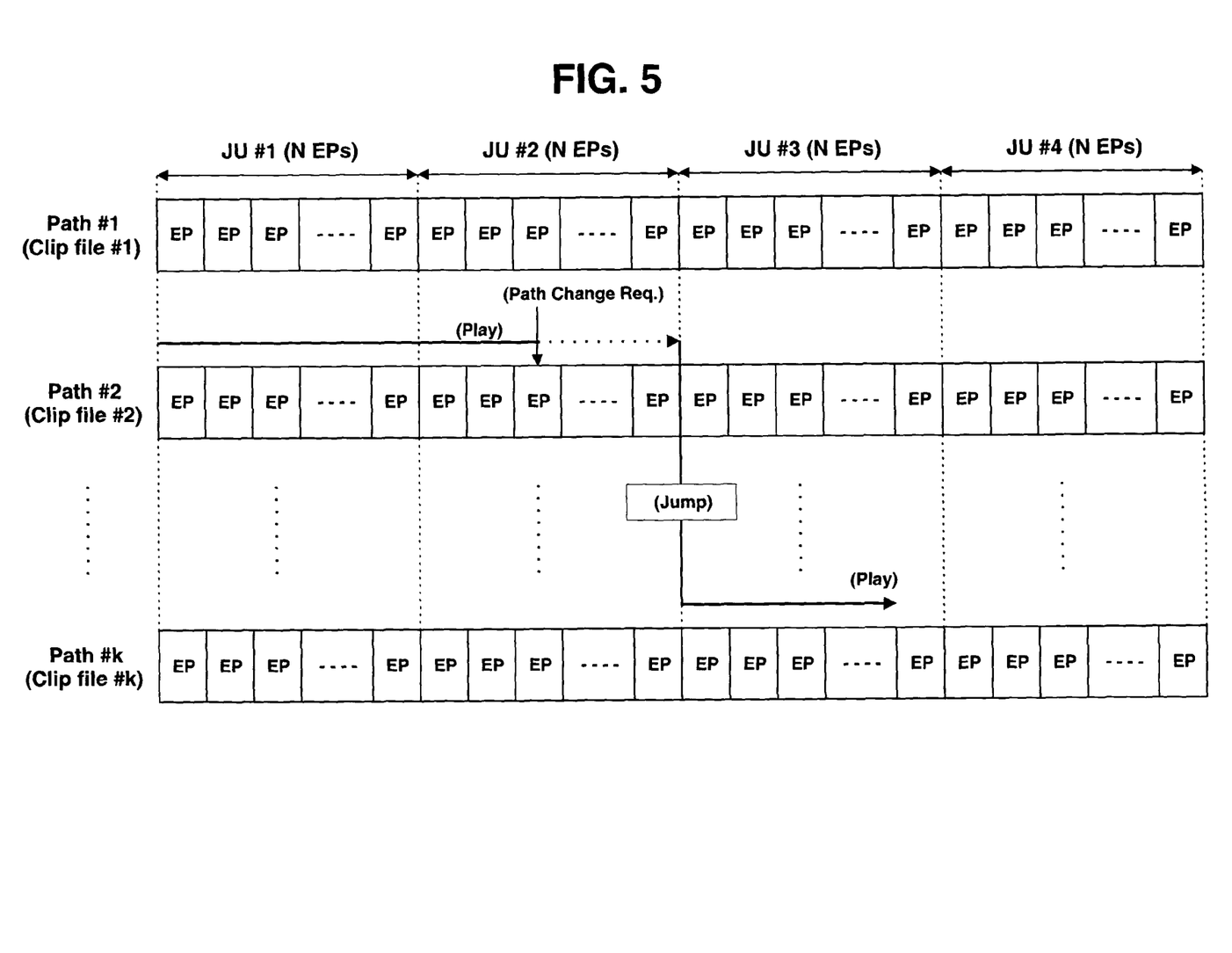
Figure 6:
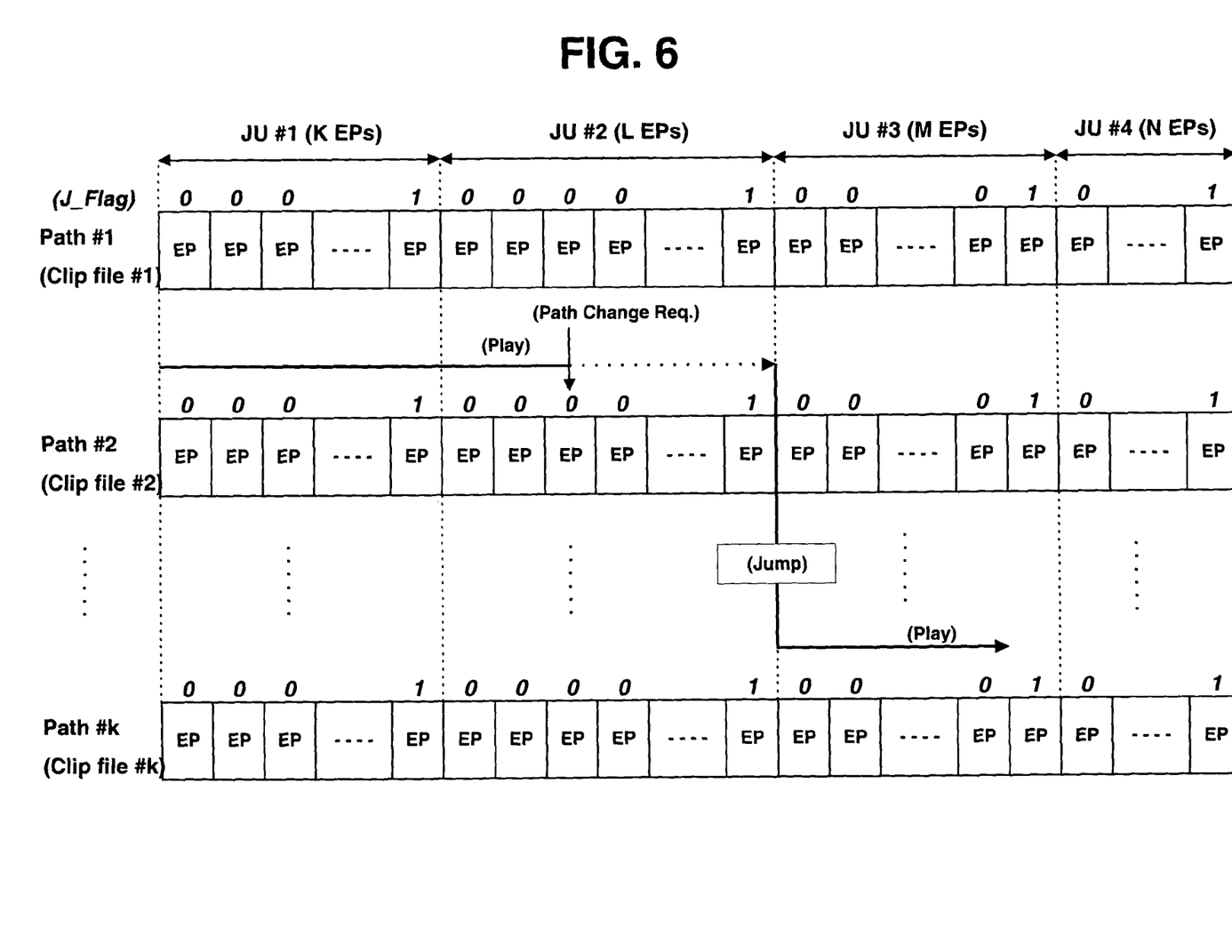

FIG. 5 illustrates an embodiment of the present invention in which reproduction path change is carried out. FIG. 5 illustrates a plurality of clip files having the same format as described above with respect to FIG. 4 except for certain differences described in detail below. As with FIG. 4, each clip file is associated with a different reproduction path. As shown in FIG. 5, each clip file may be divided into a number of jumping units and each jumping unit JU is formed of a same predetermined number of entry points. However, as shown in FIG. 6 described below, the present invention is not limited to having jumping units with the same number of entry points. Instead each jumping unit may have the same or a different number of entry points. Each entry point included in each jumping unit JU may have a variable time length. Accordingly, the time length of each jumping unit JU may be variable. However, in an alternative embodiment, each entry point may have the same fixed time length. Specifically, in FIG. 5, each of first through k-th clip files Clip file #1 to Clip file #k respectively corresponding to first through k-th paths Path #1 to Path #k and are divided into first through fourth jumping units JU #1 to JU #4. Each jumping unit of each clip file includes N entry points.

When a path change to a particular path is requested during reproduction of, for example, the data streams of the entry points included in the second jumping unit JU #2 in the second clip file corresponding to the second path, as shown in FIG. 5, the second jumping unit JU #2 is completely reproduced through the data stream of the last entry point included therein. After the complete reproduction of the second jumping unit JU #2, the clip file of the particular path requested to be reproduced, for example, the k-th path, is searched for the starting entry point of the next jumping unit thereof. That is, the third jumping unit JU #3 of the k-th Clip file is searched. This clip file corresponding to the k-th path is successively reproduced in a jumped fashion, starting from the starting entry point of the third jumping unit JU #3.

Thus, the data streams of the second path and the data streams of the k-th path are successively reproduced in a seamless fashion in the unit of jumping units.

FIG. 6 illustrates an embodiment of the present invention in which reproduction path change is carried out. FIG. 6 illustrates a plurality of clip files having the same format as described above with respect to FIG. 4 except for certain differences described in detail below. As with FIG. 4, each clip file is associated with a different reproduction path. As shown in FIG. 6, each clip file may be divided into a number of jumping units and each jumping unit JU is formed of a different number of entry points. However, as shown in FIG. 5 described above, the present invention is not limited to having jumping units with different numbers of entry points. Instead each jumping unit may have the same or a different number of entry points. Each entry point included in each jumping unit JU may have a variable time length. Accordingly, the time length of each jumping unit JU may be variable. However, in an alternative embodiment, each entry point may have the same fixed time length. Specifically, in FIG. 6, each of first through k-th clip files Clip file #1 to Clip file #k respectively corresponding to first through k-th paths Path #1 to Path #k may be managed in a divided fashion by jumping units JU, for example, a first jumping unit JU #1 grouping K entry points, a second jumping unit JU #2 grouping N entry points, a third jumping unit JU #3 grouping M entry points, and a fourth jumping unit JU #4 grouping N entry points.

The entry point map in the clip information file associated with each clip file includes a jumping flag J_Flag associated with each entry point. Each jumping flag J_Flag indicates whether a change to another reproduction path is permitted, and if a change is permitted, the jumping flag J_Flag implies the point in the clip file where the jump takes place in relation to the entry point.

More specifically, according to one exemplary embodiment of the present invention, a jumping flag "J_Flag=1" indicates a change to reproducing a clip file associated with a different reproduction path is permitted (active jumping flag), and a jumping flag "J_Flag=0" indicates that no change is permitted (inactive jumping flag). Furthermore, according to one exemplary embodiment, when the jumping flag indicates that a change is permitted, the jumping flag implies that the change is permitted after reproduction of the entry point with which the jumping flag is associated.

According to another exemplary embodiment of the present invention as shown in FIG. 6, the jumping flags define the boundaries between jumping units. Namely, as shown in FIG. 6, the entry point having an active jumping flag is the last entry point in a jumping unit, and the next entry point is the first entry point in the next jumping unit.

When a path change to a particular path is requested during reproduction of, for example, the data streams of the entry points included in the second jumping unit JU #2 in the second clip file corresponding to the second path, as shown in FIG. 6, respective jumping flags of the entry points included in the second jumping unit JU #2 are identified. The data streams of the second jumping unit JU #2 are reproduced up through the data stream of the entry point identified to include a jumping flag "J_Flag=1", that is, the last entry point in the jumping unit JU#2. Thus, the second jumping unit JU #2 is completely reproduced up through the data stream of the last entry point thereof.

After the complete reproduction of the second jumping unit JU #2, the clip file of the particular path requested to be reproduced, for example, the k-th path, is searched for the starting entry point of the next jumping unit thereof, that is, the third jumping unit JU #3 thereof. Namely, the first entry point following the entry point with an active jumping flag in the second jumping unit JU#2 of the k-th clip file is searched. The clip file corresponding to the k-th path is then successively reproduced in a jumped fashion, starting from the starting entry point of the third jumping unit JU #3.

Thus, the data streams of the second path and the data streams of the k-th path are successively reproduced in a seamless fashion in the unit of jumping units.

Alternatively, a successive reproduction in a jumped fashion, based on the jumping flags, may be achieved under the condition in which a jumping flag "J_Flag=1" is recorded in the start entry point of each jumping unit JU, whereas a jumping flag "J_Flag=0" is recorded in the other entry points of each jumping unit JU. In this embodiment, jumping from one reproduction path to another occurs at the point before the entry point with the active jumping flag.

Also, the above described clip files in the embodiments of the present invention may be recorded on the recording medium in an interleaved fashion, interleaved on a jumping unit basis. Alternatively, the clip files may be recorded on separate physical recording areas of the recording medium.

Figure 7:
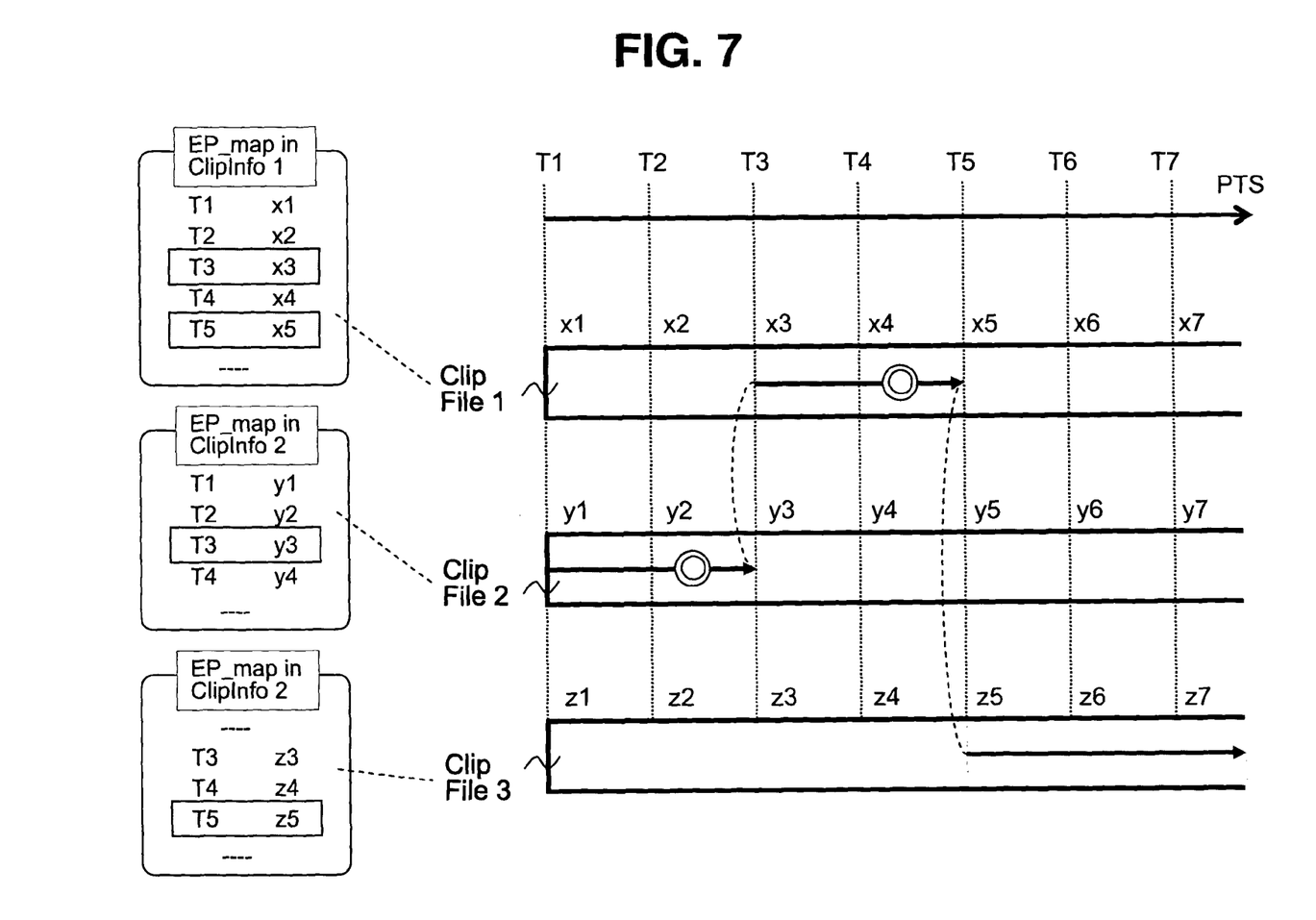
FIG. 7 illustrates the time alignment that may exist between the entry point maps for the different clip files in the embodiments of the present invention.

FIG. 7 illustrates the time alignment that exists between the EP maps for the different clip files. As discussed, an EP map maps the presentation time stamp information to a source packet. More particularly, the presentation time stamp is mapped to the address or identifier of the source packet. The address or identifier is the source packet number (SPN). FIG. 7 further shows the source packets by source packet number along the presentation time stamp axis for each clip file 1, 2, and 3. As shown, source packets in each of the EP maps 1, 2, and 3 have the same presentation time stamps. For example, source packet x1 from the first clip file 1, source packet y1 from the second clip file 2 and source packet z1 from the third clip file 3 have the same presentation time stamp T1. As such, the EP maps 1, 2 and 3 are time-aligned. Because of this time-alignment, seamless reproduction of video data is possible even when the reproduction path is changed during reproduction. FIG. 7 illustrates changes in reproduction path by two concentric circles. As shown, if a user decides to change the reproduction path from clip file 2 to clip file 1 during reproduction of the second clip file 2 and a change is permitted after reproduction of source packet y2, then after completing reproduction of source packet y2, source packet x3 is the next source packet reproduced. Similarly if a user decides to change reproduction path (e.g., change camera angle to view) from clip file 1 to clip file 3 during reproduction of clip file 1 and a change is permitted after reproduction of the source packet x4, then after completing reproduction of source packet x4, source packet z5 is reproduced. It will be understood that the source packet numbers given in the example above are merely exemplary, and that a source packet in one clip file will not, generally, have the same source packet number as a time aligned source packet in another clip file.

Figure 8:
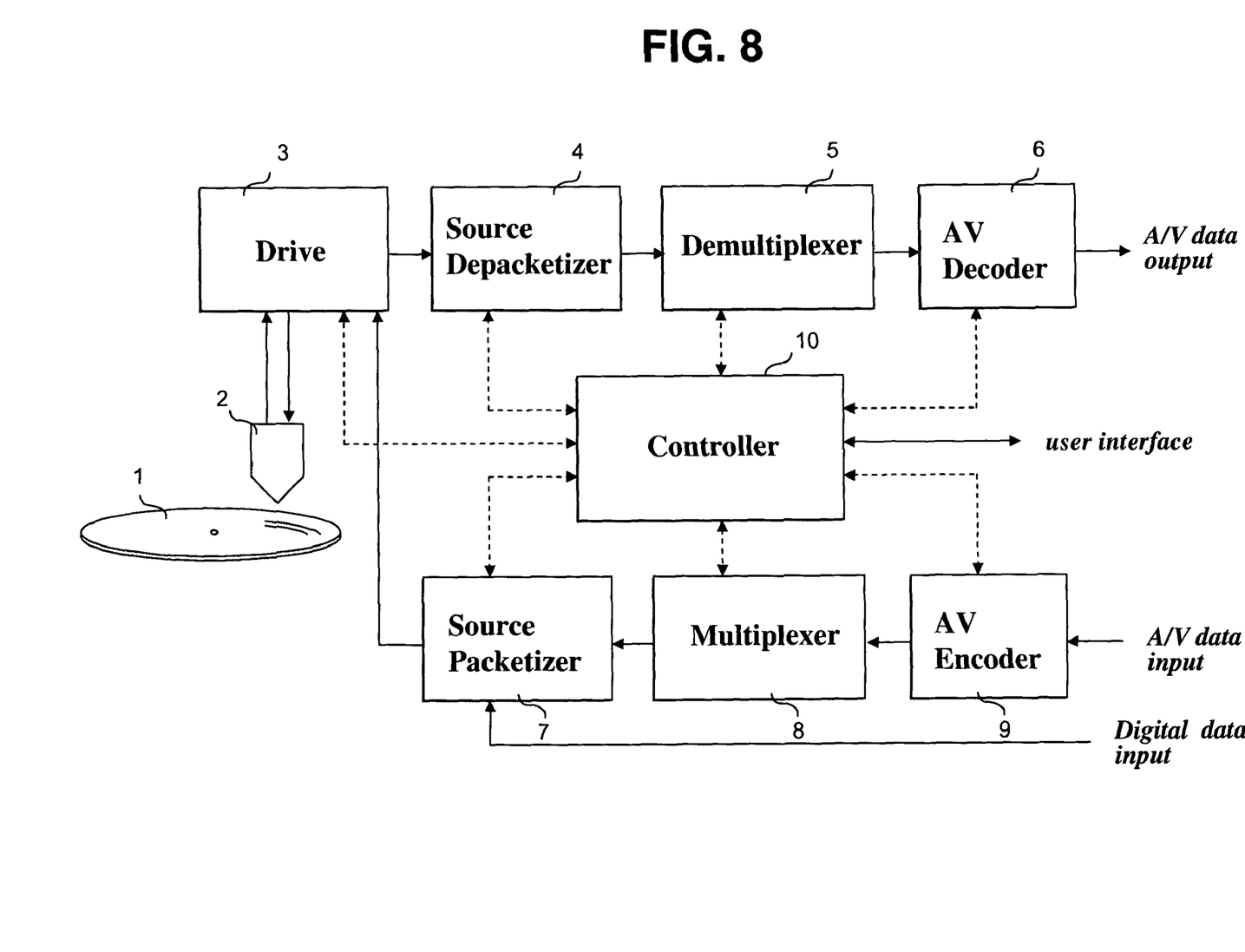
FIG. 8 illustrates a schematic diagram of an embodiment of an optical disk recording and reproduction apparatus of the present invention.

FIG. 8 illustrates a schematic diagram of an embodiment of an optical disk recording and reproducing apparatus according to the present invention. As shown, an AV encoder 9 receives and encodes audio and video data. The AV encoder 9 outputs the encoded audio and video data along with coding information and stream attribute information. A multiplexer 8 multiplexes the encoded audio and video data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 8, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the audio/video data being recorded on the optical disk. For example, based on information received via the user interface (e.g., instruction set saved on disk, provided over an intranet or internet by a computer system, etc.) the controller 10 controls the drive 3 to record the data structure of FIGS. 2 and 4, 5 or 6 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the audio/video source packets from the optical disk. For example, the user input may specify a path to reproduce. This user input may be specified, for example, via a menu based graphical user interface preprogrammed into the controller 10. Using the user input and the path management or change information reproduced from the optical disk, the controller 10 controls the reproduction of the specified path or changing the reproduction of the specified path as described in detail above with respect to the embodiments of the present invention.

The reproduced source packets are received by a source depacketizer 4 and converted into a data stream (e.g., an MPEG-2 transport packet stream). A demultiplexer 5 demultiplexes the data stream into encoded video and audio data. An AV decoder 6 decodes the encoded video and audio data to produce the original audio and video data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 8 has been described as a recording and reproducing apparatus, it will be understood that only a recording or only a reproducing apparatus may be provided using those portions of FIG. 7 providing the recording or reproducing function.

As apparent from the above description, the present invention provides a multiple reproduction path data stream managing method for high-density optical discs which can rapidly and accurately access to the data streams of the path designated by the user in a jumped fashion in order to reproduce the data streams, while being capable of minimizing a reduction in the recording efficiency of multi-path data streams.

As will be appreciated from the forgoing disclosure, the present invention provides a recording medium having a file or data structure that permits managing and/or controlling navigation of the reproduction of video data on a multiple reproduction path basis. Accordingly, the present invention provides a greater level of flexibility in the reproduction of video data than previously available.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. An optical disk storing a data structure for managing reproduction by a reproduction apparatus of video data having multiple reproduction paths, comprising:
    one or more management files for managing reproduction of the video data by the reproducing apparatus, the management file being separate from a clip file storing the video data, each clip file being associated with one of the one or more management files, each clip file of the multiple reproduction paths being associated with one of the multiple reproduction paths, the management file storing at least one entry point map associated with one of the multiple reproduction paths, each entry point map identifying a plurality of entry points in the video data for the associated reproduction path, the entry point map mapping an address of an entry point in the video data to a presentation time stamp of the entry point, wherein the entry point map includes path change information for managing changing of reproduction paths by the reproducing apparatus, the path change information having a plurality of fields, each field associated with at least one of the plurality of entry points, and the path change information includes a field for identifying whether changing reproduction paths is permitted or not in relation to the associated entry point and another field for identifying where changing reproduction path is permitted in relation to the associated entry point, the another field identifying an entry point in a current reproduction path where changing reproduction paths is permitted if the field identifies that changing reproduction paths is permitted.

2. The optical disk of claim 1, wherein the fields for permitting a change in a same associated reproduction path define one or more units of video data and wherein the field is usable for reproducing the video data seamlessly.

3. The optical disk of claim 2, further comprising:
the clip file having the video data recorded therein, and at least a portion of the video data being multiplexed on a unit of video data basis.

4. The optical disk of claim 1, wherein the multiple reproduction paths of video data are different camera angles of video data.

5. The optical disk of claim 2, wherein each unit of video data starts with an I-picture.

6. The optical disk of claim 2, wherein each unit of video data starts with a closed group of pictures (GOP).

7. The optical disk of claim 1, wherein the entry point maps are aligned in time.

8. The optical disk of claim 1, wherein if the field indicates that changing reproduction paths is permitted in relation to the associated entry point, the another field associated with the entry point indicates a start position of a data packet of the video data.

9. The optical disk of claim 1, wherein each clip file is associated with each entry point map.

10. The optical disk of claim 1, further comprising:
at least one playlist file, the playlist file including at least one playitem, the playitem identifying a playing interval in a reproduction path of the video data, the playitem indicating at least one management file for an associated reproduction path used by the corresponding playitem.

11. A method of recording a data structure for managing reproduction of video data having multiple reproduction paths on a recording medium, comprising:
recording at least one entry point map associated with one of the multiple reproduction paths in one or more management files of the recording medium, each entry point map identifying a plurality of entry points in the video data for the associated reproduction path, the entry point map mapping an address of an entry point in the video data to a presentation time stamp of the entry point, the management file being separate from a clip file for storing the video data, each clip file being associated with one of the one or more management files, each clip file of the multiple reproduction paths being associated with one of the multiple reproduction paths, wherein the entry point map includes path change information having a plurality of fields, each field associated with at least one of the plurality of entry points, and the path change information includes a field for identifying whether changing reproduction paths is permitted or not in relation to the associated entry point, and another field for identifying where changing reproduction paths is permitted in relation to the associated entry point, the another field identifying an entry point in a current reproduction path where changing reproduction paths is permitted if the field identifies that changing reproduction paths is permitted.

12. The method of claim 11, wherein the fields for permitting a change in a same associated reproduction path define one or more units of video data and wherein the field is usable for reproducing the video data seamlessly.

13. The method of claim 12, wherein at least a portion of the video data is recorded in a clip file with being multiplexed on a unit of video data basis.

14. The method of claim 11, wherein the multiple reproduction paths of video data are different camera angles of video data.

15. The method of claim 11, further comprising:
recording playlist files, the playlist file including at least one playitem, the playitem identifying a playing interval in a reproduction path of the video data, the playitem indicating at least one management file for an associated reproduction path used by the corresponding playitem.

16. A method of reproducing a data structure for managing reproduction of video data having multiple reproduction paths recorded on a recording medium, comprising:
reproducing management information from one or more management files of the recording medium, the management information including at least one entry point map associated with one of the multiple reproduction paths, each entry point map identifying a plurality of entry points in the video data for the associated reproduction path, the entry point map mapping an address of an entry point in the video data to a presentation time stamp of the entry point, the management file being separate from a clip file for storing the video data, each clip file being associated with one of the one or more management files, each clip file of the multiple reproduction paths being associated with one of the multiple reproduction paths, wherein the entry point map includes path change information having a plurality of fields, each field associated with at least one of the plurality of entry points, and the path change information includes a field for identifying whether changing reproduction paths is permitted or not in relation to the associated entry point, and another field for identifying where changing reproduction paths is permitted in relation to the associated entry point, the another field identifying an entry point in a current reproduction path where changing reproduction paths is permitted if the field identifies that changing reproduction paths is permitted; and reproducing the video data based on the management information, wherein the reproducing step further including changing a reproduction path from the current reproduction path to a requested reproduction path based on the path change information if the changing reproduction path is permitted.

17. The method of claim 16, wherein the multiple reproduction paths of video data are different camera angles of video data.

18. The method of claim 16, wherein the current reproduction path is maintained until a position at which exiting the current reproduction path is permitted.

19. The method of claim 16, further comprising:
reproducing playlist files, the playlist file including at least one playitem, the playitem identifying a playing interval in a reproduction path of the video data, the playitem indicating at least one management file for an associated reproduction path used by the corresponding playitem.

20. An apparatus for recording a data structure for managing reproduction of video data having multiple reproduction paths on a recording medium, comprising:
a recording unit configured to record data on the recording medium; and
a controller, operably coupled to the recording unit, configured to control the recording unit to record the video data having multiple reproduction paths on the recording medium, the controller configured to control the recording unit to record at least one entry point map associated with one of the multiple reproduction paths in one or more management files of the recording medium, each entry point map identifying a plurality of entry points in the video data for the associated reproduction path, the entry point map mapping an address of an entry point in the video data to a presentation time stamp of the entry point, the management file being separate from a clip file storing the video data, each clip file being associated with one of the one or more management files, each clip file of the multiple reproduction paths being associated with one of the multiple reproduction paths; and
wherein the entry point map includes path change information having a plurality of fields, each field associated with at least one of the plurality of entry points, and
the path change information includes a field for identifying whether changing reproduction paths is permitted or not in relation to the associated entry point, and another field for identifying where changing reproduction paths is permitted in relation to the associated entry point, the another field identifying an entry point in a current reproduction path where changing reproduction paths is permitted if the field identifies that changing reproduction paths is permitted.

21. The apparatus of claim 20, wherein the fields for permitting a change in a same associated reproduction path define one or more units of video data and wherein the field is usable for reproducing the video data seamlessly.

22. The apparatus of claim 20, wherein if the field indicates that changing reproduction paths is permitted in relation to the associated entry point, the another field associated with the entry point indicates a start position of a data packet of the video data.

23. The apparatus of claim 20, wherein the recording unit includes an optical pickup to record the video data.

24. The apparatus of claim 20, further comprising:
an encoder configured to encode the video data having multiple reproduction paths,
wherein the controller is configured to control the recording unit to record the encoded video data.

25. The apparatus of claim 20, wherein the controller is configured to control the recording unit to record playlist files, the playlist file including at least one playitem, the playitem identifying a playing interval in a reproduction path of the video data, the playitem indicating at least one management file for an associated reproduction path used by the corresponding playitem.

26. An apparatus for reproducing a data structure for managing reproduction of video data having multiple reproduction paths recorded on a recording medium, comprising:
a reproducing unit configured to reproduce data recorded on the recording medium;
a controller, operably coupled to the reproducing unit, configured to control the reproducing unit to read an entry point map associated with one of the multiple reproduction paths from one or more management files of the recording medium, each entry point map identifying a plurality of entry points in the video data for the associated reproduction path, the entry point map mapping an address of an entry point in the video data to a presentation time stamp of the entry point, the management file being separate from a clip file storing the video data, each clip file being associated with one of the one or more management files, each clip file of the multiple reproduction paths being associated with one of the multiple reproduction paths,
wherein the entry point map includes path change information having a plurality of fields, each field associated with at least one of the plurality of entry points, and
the path change information includes a field for identifying whether changing reproduction paths is permitted or not in relation to the associated entry point, and another field for identifying where changing reproduction paths is permitted in relation to the associated entry point, the another field identifying an entry point in a current reproduction path where changing reproduction paths is permitted if the field identifies that changing reproduction paths is permitted; and
the controller configured to control the reproducing unit to reproduce the video data based on the one of more management files, wherein the controller is further configured to control the reproducing unit to reproduce a requested reproduction path based on the path change information if the changing reproduction path from the current reproduction path to the requested reproduction path is permitted.

27. The apparatus of claim 26, wherein the reproducing unit includes an optical pickup to reproduce the video data.

28. The apparatus of claim 26, wherein the another field associated with the entry point indicates a start position of a unit associated with the entry point, wherein the field is usable for reproducing the video data seamlessly.

29. The apparatus of claim 26, wherein the current reproduction path is maintained until a position at which exiting the current reproduction path is permitted.

30. The apparatus of claim 26, wherein the controller is configured to read playlist files, the playlist file including at least one playitem, the playitem identifying a playing interval in a reproduction path of the video data, the playitem indicating at least one management file for an associated reproduction path used by the corresponding playitem.

* * * * *